Dec. 8, 1964 T. C. HALL ETAL 3,160,539

SURFACE TREATMENT OF SILICON

Filed July 18, 1961

Inventors:
Thomas C. Hall
Alan L. Harrington
and Joan M. Criskal.
By Spensley and Horn
Att'ys.

United States Patent Office 3,160,539

Patented Dec. 8, 1964

3,160,539

SURFACE TREATMENT OF SILICON

Thomas C. Hall, Palos Verdes Estates, Alan L. Harrington, Los Angeles, and Joan M. Crishal, Torrance, Calif., assignors to TRW Semiconductors, Inc., a corporation of Delaware Filed July 18, 1961, Ser. No. 134,795
5 Claims. (Cl. 156—17)

This invention relates to etchants, and more particularly to a new and improved etch which will selectively etch elemental silicon.

This application is a continuation-in-part of co-pending U.S. patent application Serial No. 829,929, filed July 27, 1959, entitled "Surface Treatment of Silicon," now abandoned. This latter co-pending application is a continuation-in-part of previously filed U.S. patent application Serial No. 759,458, filed September 8, 1958, entitled "Surface Treatment of Silicon," now abandoned.

Elemental silicon, preferably of a very high order of purity and of a single crystal unit structure is the most important building block used in present art semiconductor electrical translating devices.

In preparing the silicon wafers for use in semiconductor devices, such as diodes and transistors, and the like, it is necessary to clean the surface thereof. This is due to the fact that the electrical characteristics of the completed device are, to a large degree, determined by the surface condition of the semiconductor material. It is well known to use various combinations of chemical etching reagents to clean the surface areas to remove lattice distortions and the like from the crystal.

It is also well known to use such chemical etching reagents to shape the device, either during the intermediate steps in production or to provide a plurality of devices which are formed on a single parent crystal. In accordance with present art techniques, most etchants involve the use of either acid solutions such as a mixture of nitric acid, hydrofluoric acid and acetic acid or a strong base solution such as sodium hydroxide.

These prior art etchants, in general, etch at a relatively rapid rate, making their use difficult if not impossible with minute silicon structures. Further, the present art acidic and basic etchants can attack the metal base to which the silicon body is generally attached, thus requiring additional procedures to mask the surfaces other than the silicon over the areas to be etched. The present invention etch, on the other hand, has been found to be nonreactive with all noble and amphoteric metals. It appears, however, that the native oxides on the amphoteric metals form a soluble complex salt with one of the constituents of the etch, e.g. catechol, but thereafter no further reaction of consequence occurs.

Still another disadvantage in using a strongly basic or acidic solution for etching silicon is the obvious danger attendant in the handling of such solutions.

It is therefore a primary object of the present invention to provide a new composition for etching elemental silicon.

Another object of the present invention is to provide a new and improved etchant which will selectively etch silicon.

A further object of the present invention is to provide an improved etch for silicon which will permit controlled etching of relatively minute structures.

Still another object of the present invention is to provide an improved etchant for silicon which is inherently safer to handle than our present art basic or acidic etchants.

Basically, the present invention etch includes a solution with a pH in the approximate range from 9–12 which will oxidize silicon, and which will dissolve the silicon so oxidized.

In accordance with the presently preferred embodiment of this invention, a solvent such as hydrazine has dissolved therein a solute which is an aromatic compound having at least two hydroxyl groups attached to adjacent carbon atoms.

The amount of solute used in accordance with this embodiment is a function of the amount which the solvent will take into solution and the amount of silicon to be etched, as will hereinafter be explained.

More particularly, in accordance with the presently preferred embodiment of the invention, the inventors have found that catechol dissolved in hydrazine in the ratio of approximately 1 gm. of catechol to 10 gms. of hydrazine produces an ideal etch. Typically, the solution is kept at a temperature in the range from 90° C. to 110° C. for best results.

While the novel and distinctive features of this invention are particularly pointed out in the appended claims, a more expository treatment of the invention in principal and in detail, together with additional objects and advantages thereof, will be better understood when considered in connection with the following description and accompanying drawing in which like reference characters are used to refer to like parts throughout the various views.

Figures 1, 2:
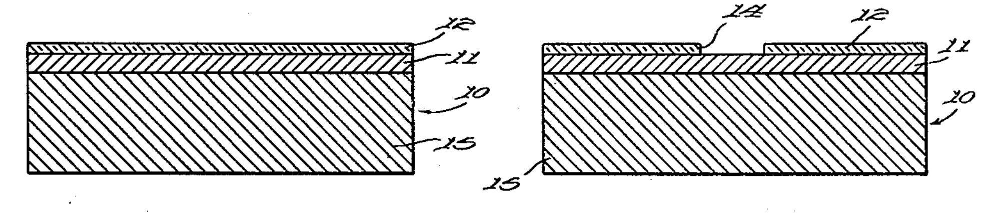
FIGURE 1 is a cross-sectional view of a silicon wafer at an early stage of production of a transistor which may be constructed by use of the present invention etch as a tool.
FIGURE 2 is a cross-sectional view of the wafer of FIGURE 1 during an intermediate stage of production.

This invention basically involves the discovery that two closely related systems involving the use of a solvent which has the pH in the range from just below 9 to as much as just above 12 will under certain conditions, selectively etch silicon by oxidizing the same. In one system, anhydrous hydrazine, as the solvent, has dissolved therein an aromatic compound having at least two adjacent hydroxyl groups attached to adjacent carbon atoms.

The most satisfactory etch of this type which has been discovered by the inventors consists essentially of anhydrous hydrazine ($N_2H_4$) in which catechol ($C_6H_4(OH)_2$), sometimes called 1,2-benzenediol, has been dissolved. The molecular weight of this solute is 110.11.

The second and related system in accordance with the present invention involves a water solution. This system requires the same solute as indicated above in connection with the description of the first system. This second system employs a solvent whose pH is in the range from 9–12 and which will also oxidize elemental silicon. Two classes of this second system etch have been found to be operative. The first class requires at least 5% and no more than 50% water by volume admixed with hydrazine. The second class of etch requires the same amount of water as does the first class admixed with a solvent which has a pH in the range from 9–12. The solvents which have been found operative in the second class include piperidine, ethylamine, ammonium hydroxide, and a compound with two or more primary amino groups where the number of carbon atoms between the carbon directly attached to the amino group is either 0 or 1, i.e. is not more than 1 (such as ethylenediamine, 1,2-diaminopropane, 1,3-diaminopropane, etc.), all of which may be characterized as aliphatic organic amines. Solutes which have been found operative with these solvents include catechol, the approved name which is 1,2-benzenediol; pyrogallol, whose approved name is 1,2,3-benzenetriol; 1,2,3,5-benzenetetrol; 1,2,4,5-benzenetetrol; 1,2-naphthalenediol; 2,3-naphthalenediol; 1,2-anthracinediol; protocatechuic acid; pyrocatecholsulfonephthalein; and 2,3-napthalene-6-sulfonic acid.

The present invention etch has been found to remove silicon material with donor and acceptor concentrations up to $10^{18}$ atoms/cm.$^3$. The rate of removal of silicon decreases rapidly with higher impurity concentrations so that the etch rate becomes very small at concentrations above this value.

The mechanism which prevails in accordance with the first system mentioned hereinabove is believed to involve the following: The anhydrous hydrazine oxidizes the silicon which oxidation is believed necessary for the reaction to occur.

It is believed that hydrazine oxidizes the silicon and also provides the basic (in the pH sense) medium which is necessary for the reaction to occur. Once the silicon is oxidized, it complexes with the catechol forming an anion which reacts with hydrazinium ions ($N_2H_5^{+1}$) present to form a completely soluble complex.

When anhydrous hydrazine is used in conjunction with catechol as the etch, the pH is 9.0. At this pH amphoteric metals are nonreactive. It appears, however, that the native oxides on these metals form a soluble complex salt with the catechol, but thereafter no further reaction or consequence occurs. Further, silica in the form of a glass-like coating which can be formed on the surface of a silicon body is not attacked appreciably, if at all, by this etch.

In the anhydrous system the following reaction mechanism is believed to occur:

$$(1)\quad \underset{\text{Base 2}}{6N_2H_4} + \underset{\text{Acid 1}}{3C_6H_4(OH)_2} \rightleftarrows \underset{\text{Acid 2}}{6N_2H_5^{+1}} + \underset{\text{Base 1}}{3(C_6H_4O_2)^{-2}}$$

$$(2)\quad (a)\ \underset{\text{Red. 1}}{Si} + \underset{\text{Oxid. 2}}{4N_2H_5^{+1}} \longrightarrow \underset{\text{Oxid. 1}}{Si^{+4}} + 4e^- + \underset{\text{Red. 2}}{4N_2H_4} + 4H^+$$

$$(b)\ 4H^+ + 4e^- \longrightarrow 2H_2$$

$$(3)\quad 2N_2H_5^{+1}+Si^{+4}+3(C_6H_4O_2)^{-2} \rightarrow (N_2H_5)_2{}^{+2}Si(O_2C_6H_4)_3{}^{-2}$$

Reaction (1) represents the equilibrium mixture when catechol is dissolved in hydrazine. The hydrazine acts as a basic solvent as it tends to accept protons. Equation 2 represents the oxidation of silicon and the simultaneous reduction of hydrazinium ions. Since a gas, $H_2$, has been found to evolve during the etching process it is assumed that reaction (2)(*b*) occurs rather than the formation of a silicon hydride. Ordinarily, the reductant, herein silicon, will accept a proton, but silicon hydride is a very unstable compound. Finally, Equation 3 represents the combination of the ions to form the soluble complex silicon hydrazinium salt. It can therefore be seen from these equations dealing with the anhydrous system as well as from equations hereinafter dealing with a water system, that the etch including a combination of the solvent and the hydrocarbon is an oxidizer of elemental silicon and that the etch dissolves the nongaseous oxidation products of the reaction by the silicon and the etch.

The above etch has been used, for example, to accomplish the following: An N type conductivity single crystal silicon wafer approximately 1 inch in diameter and 1/16 inch thick was placed into a solution consisting of 1 gm. of catechol and 10 gms. of anhydrous hydrazine. At this point it should be mentioned that it has been found that there is required to be 3 mols of catechol to one mol of silicon in order for the etching reaction to continue to completion. The solution including the above-described silicon wafer, was then heated to a temperature in the range from 90° C. to 110° C., preferably 110° C., for approximately six hours. It was found that after the wafer was taken from the etch that there had been removed approximately 6 mils, indicating an etching rate of 1 mil per hour.

In the following experiment we will more graphically demonstrate the precise control which may be achieved by the present invention. A silicon sample wafer upon which had been grown an oxide film was first weighed and found to be 0.1609 gm., which (neglecting the weight of the oxide coating) is equivalent to $0.572\times10^{-2}$ mols. of silicon. Actually, the above approximation which neglects the weight of the oxide coating is fairly accurate as the wafer was approximately 1/16 inch thick. As has previously been stated, there is required a minimum of 3 mols. of catechol to react with one mol. of silicon. When using solutes with anhydrous hydrazine as the solvent as hereinafter mentioned, the ratio of silicon to the solute remains at 1:3. Thus, it can be calculated that $3(0.572\times10^{-2}\times110.1)$ equals 1.9 gms. of catechol are required to remove all of the silicon, again assuming the oxide coating upon the silicon to be of negligible weight. In order to demonstrate the exact control which may be achieved, the wafer described above was placed into a beaker including approximately 5 mls. of hydrazine into which has been dissolved 1.9 gms. of catechol. The solution was brought up to a temperature of 110° C. and maintained thereat for approximately 12 hours. At the end of that time the wafer was removed; all that remained was the very thin oxide film and further no catechol was found to be in the solution. When less catechol was added to the etch in the same experiment some silicon remained when all of the catechol was spent.

It has been found that in addition to catechol, other aromatic compounds having at least two hydroxyl groups attached to adjacent carbon atoms are satisfactory as a complexing medium. Among the aromatic compounds which may be used as a solute in the etch in accordance with the present invention as has been previously mentioned are catechol, sometimes called pyrocatechol, the approved name of which is 1,2-benzenediol; pyrogallol, whose approved name is 1,2,3-benzenetriol; 1,2,3,5-benzenetetrol; 1,2,4,5-benzenetetrol; 1,2-naptholenediol; 2,3-naptholenediol; 1,2-anthracenediol; protocatechuic acid; hydrocatecholsulphonephthalein; and 2,3-napthalenediol-6-sulfonic acid. All of the above listed aromatic compounds may be seen to have at least two hydroxyl groups attached to adjacent carbon atoms in at least one of the six membered carbon rings where the particular compound includes one or more six membered carbon rings.

The second system in accordance with the present invention involves the use of a solvent which includes water as an additive in the etch. Two classes of such etch have been found to be operable. The first involves the use of anhydrous hydrazine to which has been added an amount of water which may vary from 5 to 50% by volume of the combined solution. The pH of this solution varies from between 11.8 to 12. This first class of the second system etch does, as will be apparent from the following equation, have a tendency to attack silica as well as silicon. However, the rate of attack of the etch has been found to be of the order of 100 times as great for silicon as compared to silica, thus it may be considered as being selective to silicon and will still effectively permit silicon oxide to act as a mask, thus satisfying the criterion established for the present invention. The mechanism which is believed to occur is as follows:

$$(1)\quad 6N_2H_4+6H_2O\rightleftarrows6N_2H_5^{+}+6OH^{-}$$

(2) (a) $Si+6OH^- \rightarrow Si^{+4}(OH)_6^{-2}$
(b) $2N_2H_5^+ + Si(OH)_6^{-2} \rightarrow (N_2H_5)_2SiO_3 + 3H_2O$ The second class of etch in accordance with the present invention, makes use of any of the aromatic compounds hereinabove mentioned as the solute, together with any of the solvents above indicated with the exception of hydrazine. Here again, water is added to the solvent in an amount which may vary from 5–50% by volume of the combined solution. This second class of etch in accordance with the present invention permits of the greatest flexibility in the reagents. It requires a solvent whose pH is in the range from 11–12 and which will oxidize elemental silicon, together with a solute which is an aromatic compound having at least two hydroxyl groups in at least one of the six membered carbon rings where the particular compound includes one or more six membered carbon rings. Among the solvents which may be used in accordance with the present invention more specifically are ethylamine, piperidine, ammonium hydroxide and a compound with two or more primary amino groups where the number of carbon atoms between the carbon directly attached to the amino group is either 0 or 1 (such as ethylenediamine; 1,2-diaminopropane; 1,3-diaminopropane) to which has been added an amount of water equal to 5–50% by volume of the combined solution.

When using any of the solvents in accordance with any of the hereinabove mentioned solutes, with the exception of anhydrous hydrazine, out of caution to inhibit oxidation of the solvents, they should be kept away from the air, i.e., they should be kept in an inert atmosphere such as argon or be sealed in a container at its own vapor pressure during the etching process.

In accordance with the present invention it has been further found that any combination of the listed solvents or solutes may be used to produce the etch of the present invention. The reaction temperature is not found to be critical as the reaction proceeds even at room temperature. However, the rate of reaction increases with increasing temperature and it is preferred to operate at temperatures between 90° C. and 110° C. Higher temperatures, that is, temperatures above the boiling point of the solvent, i.e., 113° C. for hydrazine, for example, may be used in pressure equipment.

As the etch of the present invention is typically used to clean the surface of a silicon diode, for example, to remove surface damage or the like, the etch will be disposed upon the surface of the crystal upon which a layer of silicon dioxide exists. This is due to the strong affinity which silicon has for oxygen. The reaction hereinabove described which explains the mechanism of the present invention, assumes a silicon surface as opposed to a silicon dioxide surface. It has been found by the inventors, however, that even with a native oxide coating, the reaction will occur if the temperature of the etch is raised to close to that of the boiling point thereof, as there is at this high temperature a greater probability that the native oxide coating will be pierced. Once the reaction has been started the temperature may be reduced and the reaction will continue as there will now be an exposed silicon surface. It should be further pointed out that if the silicon dioxide coating is relatively thick, the reaction may be able to be started by placing the dioxide coated silicon crystal in a solution of hydrofluoric acid which will remove the oxide coating. This treatment has normally been found to be required in order for the reaction to commence in accordance with the second class of etchants of the second system hereinabove described.

If hydrazine is diluted in water, the pH of the hydrazine solution rises and therefore will now act in much the same manner as the ammonium hydroxide solution. In the aqueous solution of hydrazine-catechol the following reaction mechanism is believed to occur:

(1) (a) $6N_2H_4 + 6H_2O \rightleftarrows 6N_2H_5^+ + 6OH^-$
(b) $6N_2H_4 + 3C_6H_4(OH)_2 \rightarrow 6N_2H_5^{+1} + 3(C_6H_4O_2)^{-2}$ (2) (a) $Si+6OH^- \rightarrow Si(OH)_6^{-2} + 4e^-$
(b) $4N_2H_5^+ + 4e^- \rightarrow 4N_2H_4 + 2H_2$
(3) (a) $(SiO_2)_x + 2H_2O \rightarrow xSi(OH)_4$
(b) $Si(OH)_4 + H_2O + OH^- \rightarrow (H_2O)Si(OH)_5^{-1}$
(c) $(H_2O)Si(OH)_5^{-1} + OH^- \rightarrow Si(OH)_6^{-2} + H_2O$
(4) (a) $2N_2H_5^{+1} + Si(OH)_6^{-2} + 3(C_6H_4(OH)_2 \rightarrow (N_2H_5)_2Si(C_6H_4O_2)_3 + H_2O$
(b) $8N_2H_5^{+1} + Si(OH)_6^{-2} + 3(C_6H_4O_2)^{-2} \rightarrow (N_2H_5)_2Si(C_6H_4O_2)_3 + 6N_2H_5^+ + 6OH^-$ Ammonia, ethylamine, piperidine, and any of the amino compounds as above described may be substituted for the hydrazine in the equations above. From Equations 3 (a), (b), and (c), we see that silica as well as silicon can be attacked when hydroxyl ions are present, but at the pH range from 11–12 the rate is still slow compared to the rate of attack on elemental silicon, that has been found to be 100 times as slow.

In the aqueous solution where the pH is in the range from 11–12, the following side reactions can also occur with sicilon, silica and silicate. The equations for this are as follows:

(1) $Si+6OH^- \rightarrow Si^{+4}(OH)_6^{-2}$
(2) (a) $(SiO_2)_x + 2x(H_2O) \rightarrow x[Si(OH)_4]$
(b) $Si(OH)_4 + H_2O + OH^{-1} \rightarrow (H_2O)Si(0H)_5^{-1}$
(c) $H_2OSi(OH)_5^{-1} + OH^{-1} \rightarrow Si(OH)_6^{-2} + H_2O$
(3) $Si(OH)_6^{-2} + 3(C_6H_4)(OH)_2 \rightarrow Si(C_6H_4O_2)_3^{-2} + 6H_2O$ Thus, we see that silicon, silica, and silicate can be attacked by a strongly alkaline solution. In the case of Equation 2(c), the larger the value of $x$ the higher the concentration of $OH^-$ ions must be to effect dissolution.

Referring now to the drawing, and particularly to FIGURE 1, there is shown a cross-sectional view of a silicon wafer 10 upon which has been formed a heavy P type conductivity region 11. During the diffusion step which results in the production of region 11 there will be produced an oxide layer 12 atop the P type conductivity region 11. As has previously been stated the etch solution of the invention is selective to silicon and therefore, will not appreciably attack a relatively thick oxide coating. This fact enables the use of a thermally generated oxide film, i.e., at least 1 micron thick as a mask to permit controlled etching in small predetermined area.

Figures 3, 4:
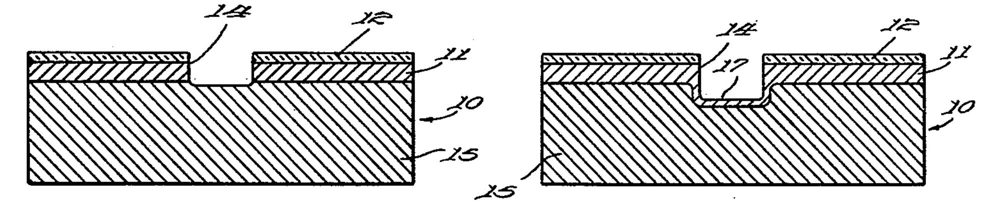
FIGURE 3 is a cross-sectional view of the wafer of FIGURE 2 after it has been subjected to the present invention etch.
FIGURE 4 is a cross-sectional view of the wafer of FIGURE 3 during a later stage of production.

In FIGURE 2 there is shown the wafer of FIGURE 1 in which a channel 14 has been established through the oxide coating 12. The channel 14 may be produced by any manner well known to the art, such as, for example, by the use of hydrofluoric acid. The hydrofluoric acid may be used in conjunction with wax to define the limits of the channel 14. It will, of course, be appreciated that hydrofluoric acid, while attacking the oxide coating, will not ordinarily attack elemental silicon and therefore will not etch into the P type conductivity layer 11. Immediately after the formation of the channel 14, the wafer 10 may be placed into the etch of the present invention, which will, of course etch silicon, in order to produce a deepening of the channel as is indicated in FIGURE 3. Inasmuch as the present invention etching is relatively slow acting and controllable, it may be made to etch just as much of the P type conductivity region as to barely expose N type conductivity region 15 therebelow. It is next desired to produce a thin base layer 17 (see FIGURE 4), along the bottom of the channel. This may be accomplished by placing the crystal body into the oven in the presence of an N type conductivity active impurity and heating the oven to the diffusion temperature. There will thus be produced the thin base layer 17 within the channel. Thereafter an emitter layer 18 (see FIGURE 5) may be diffused within the base layer 17 to complete the transistor.

It has been found by the inventors that the etch of the present invention will permit the etching of a channel of the type herein described which has relatively sharp edges rather than the irregular and round non-controlled channel which would be produced by using any of the strong acid or base etches presently known to the art.

Figures 5, 6:
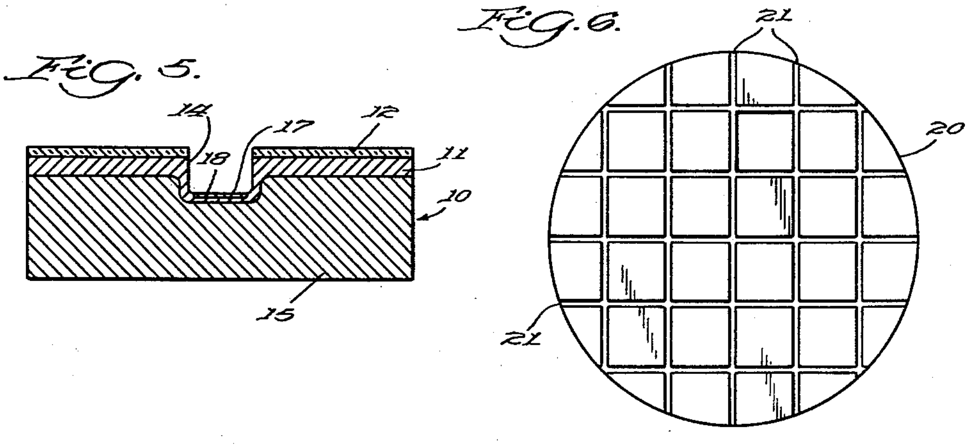
FIGURE 5 is a cross-sectional view of a complete transistor structure.
FIGURE 6 is a plan view showing how the present invention etch may be advantageously used to make a plurality of dice from a larger silicon wafer.

In FIGURE 6 there is shown a relatively large silicon wafer 20 which may be desired to be cut into small dice to be made into semiconductor devices such as transistors. Accurate ruling or scribing lines 21 on the wafer 20 of FIGURE 6 may first be made in accordance with well known techniques thus cutting through the surface oxide film greater than 0.25 mil in thickness. This surface oxide film will act as a mask, thus the entire wafer 20 may then be placed in an etch solution in accordance with the present invention to produce a multiplicity of small dice from the large wafer 20, all of the dice being of exactly the same dimension. This latter feature permits the production for special purposes, if desired, of two transistors, exactly alike in one package, as the etch will allow two structures to be processed as one and then be severed after mounting.

There has thus been described a new and improved etching solution for elemental silicon. It will be understood that modification and variations may be effected without departing from the novel concept of the invention as defined by the following claims.

What is claimed as new is:

1. A method of etching elemental silicon including the steps of: dissolving an aromatic compound having at least two hydroxyl groups attached to the adjacent carbon atoms in a solvent selected from the group consisting essentially of anhydrous hydrazine, ethylamine, ammonium hydroxide, piperidine, and an organic aliphatic compound with two or more primary amino groups where the number of carbon atoms between the carbon directly attached to the amino groups is not greater than 1, to which has been added water in the range from 5–50% by volume of the combined solution; and maintaining said solution at a temperature in the range from 90° C. to 110° C.; and applying the resulting solution to elemental silicon, said etch being an oxidizer of elemental silicon and being a solvent for the non-gaseous oxidation product of the reaction by the silicon and the etch.

2. A method of etching elemental silicon including the steps of: dissolving an aromatic compound selected from the group consisting essentially of 1,2-benzenediol; 1,2,3-benzenetriol; 1,2,3,5-benzenetetrol; 1,2,4,5-benzenetetrol; 1,2-naphthalenediol; 2,3-naphthalenediol; 1,2-anthracenediol; protocatechuic acid; pyrocatecholsulphonethalein; and 2,3-napthalenediol-6-sulfonic acid in a solvent selected from the group consisting essentially of anhydrous hydrazine, ethylamine, ammonium hydroxide, piperidine, and an organic aliphatic compound with two or more primary amino groups where the number of carbon atoms between the carbon directly attached to the amino groups is not greater than 1, to which has been added water in the range from 5–50% by volume of the combined solution; and maintaining said solution at a temperature in the range from 90° C. to 110° C.; and applying the resulting solution to elemental silicon, said etch being an oxidizer of elemental silicon and being a solvent for the non-gaseous oxidation product of the reaction by the silicon and the etch.

3. The method of improving the electrical characteristics of a silicon body including the steps of: etching the surface of said body with a solution comprising an aromatic hydrocarbon selected from the group consisting of 1,2-benzenediol; 1,2,3-benzenetriol; 1,2,3,5-benzenetetrol; 1,2,4,5-benzenetetrol; 1,2-naphthalenediol; 2,3-naphthalenediol; 1,2-anthracenediol; protocatachuic acid, and pyrocatecholsulfonephthalein, said aromatic hydrocarbon being dissolved in a solvent selected from the group consisting of anhydrous hydrazine, ethylenediamine, ethylamine, piperidine, and ammonium hydroxide to which has been added water equal to 5 to 50% by volume.

4. The method of etching elemental silicon including the steps of: dissolving an aromatic hydrocarbon having at least two hydroxyl groups attached to adjacent carbon atoms in a solvent selected from the group consisting of anhydrous hydrazine, ethylenediamine, ethylamine, piperidine and ammonium hydroxide to which has been added an amount of water equal to 5 to 50% by volume, the number of mols of said aromatic hydrocarbon being at least in the ratio of 3 mols of hydrocarbon to each mol of silicon to be etched, and etching elemental silicon with the resulting solution.

5. The method of etching elemental silicon including the steps of: dissolving an aromatic hydrocarbon having at least two hydroxyl groups attached to adjacent carbon atoms in a solvent selected from the group consisting of anhydrous hydrazine, ethylenediamine, ethylamine, piperidine and ammonium hydroxide to which has been added an amount of water equal to 5 to 50% by volume, the number of mols of said aromatic hydrocarbon being at least in the ratio of 3 mols of hydrocarbon to each mol of silicon to be etched, maintaining said solution at a temperature in the range from 90° C. to 110° C., and etching elemental silicon with the resulting solution.

References Cited by the Examiner

UNITED STATES PATENTS

| | | | |
|---|---|---|---|
| 2,419,975 | 5/47 | Trivelli et al. | 96—66 |
| 2,488,186 | 11/49 | Grangaard | 260—621 |
| 2,680,066 | 6/54 | Michel et al. | 149—35 |
| 2,882,152 | 4/59 | Dickerson | 96—66 |
| 2,956,912 | 10/60 | Kroger et al. | 29—25.3 |

OTHER REFERENCES

Mellor, J. W.: Comprehensive Treatise on Inorganic and Theoretical Chem. in vol. VIII, © 1928, pub. by Longman, Green and Company, pp. 308–322.

Condensed Chemical Dictionary, 5th edition, pub. Reinhold Publishing Company, N.Y.C., 1956, p. 921.

Audrieth and Ogg: Chemistry of Hydrazine (pp. 55, 143, 227), pub. John Wiley & Sons, N.Y.C., © 1951.

EARL M. BERGERT, *Primary Examiner.*

CARL F. KRAFFT, JACOB STEINBERG, *Examiners.*